(12) United States Patent
Schmid

(10) Patent No.: US 6,425,246 B1
(45) Date of Patent: Jul. 30, 2002

(54) METHOD FOR REGULATING OR CONTROLLING A SUPERCHARGED INTERNAL COMBUSTION ENGINE

(75) Inventor: Wolfram Schmid, Nuertingen (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/806,023

(22) PCT Filed: Aug. 28, 1999

(86) PCT No.: PCT/EP99/06341
§ 371 (c)(1),
(2), (4) Date: Jul. 3, 2001

(87) PCT Pub. No.: WO00/19073
PCT Pub. Date: Apr. 6, 2000

(30) Foreign Application Priority Data

Sep. 26, 1998 (DE) .......................... 198 44 214

(51) Int. Cl.⁷ ............................. F02D 23/00
(52) U.S. Cl. ............ 60/602; 60/600; 60/601; 60/603; 123/564
(58) Field of Search ............ 60/602, 600, 601, 60/603; 123/564

(56) References Cited

U.S. PATENT DOCUMENTS

| | | | |
|---|---|---|---|
| 4,848,086 A | * 7/1989 | Inoue et al. | 60/602 |
| 5,440,879 A | * 8/1995 | Dellora | 60/602 |
| 5,782,092 A | 7/1998 | Schultalbers et al. | 60/602 |
| 6,089,018 A | * 7/2000 | Bischoff et al. | 60/602 |
| 6,134,889 A | * 10/2000 | Markyvech et al. | 60/602 |
| 6,161,383 A | * 12/2000 | Aschner et al. | 60/602 |

FOREIGN PATENT DOCUMENTS

| | | |
|---|---|---|
| DE | 40 25 901 | 1/1992 |
| DE | 195 31 871 | 11/1996 |
| DE | 197 28 352 | 8/1998 |
| DE | 198 04 466 | 8/1999 |

\* cited by examiner

Primary Examiner—Thomas Denion
Assistant Examiner—Thai-Ba Trieu
(74) Attorney, Agent, or Firm—Crowell & Moring LLP

(57) ABSTRACT

A method for a closed-loop or an open-loop control of a forced-induction internal combustion engine that includes an exhaust turbocharger having an exhaust turbine with a variable turbine geometry for a variable adjustment of an effective turbine cross section and with a boost-air compressor, different operating states of the engine are assigned different characteristic maps with engine-operating and/or engine-state variables and the turbine geometry is adjusted in accordance with the characteristic maps between an open position and a pressure build-up position. When there is a change in a significant engine parameter, the system switches between two characteristic maps. In order to optimize an operating behaviour of the engine over all load and engine-speed ranges, a load gradient and/or an engine-speed gradient is determined as the engine parameter for the purpose of identifying a steady-state operation or a nonsteady-state operation of the engine, and the steady-state operation and the nonsteady-state operation of the engine are each assigned a characteristic map assigned to the steady-state operation being configured for a lower boost pressure and an optimum consumption and the characteristic map assigned to the nonsteady-state operation being configured for a higher boost pressure and an optimum dynamic response.

9 Claims, 2 Drawing Sheets

METHOD FOR REGULATING OR CONTROLLING A SUPERCHARGED INTERNAL COMBUSTION ENGINE

BACKGROUND AND SUMMARY OF INVENTION

This application claims the priority of German Patent Document 198 44 214.9, filed in Germany on Sep. 26, 1998 and PCT/EP99/06341 filed in Europe on Aug. 28, 1999 the disclosures of which are expressly incorporated by reference herein.

The invention relates to a method for the closed-loop or open-loop control of a forced-induction internal combustion engine.

German Reference DE 40 25 901 C1 has disclosed an exhaust turbocharger for an internal combustion engine that has a turbine with a turbine geometry that can be varied by means of variable turbine guide vanes and a compressor driven by the turbine for increasing the boost pressure in the cylinder inlet. The turbine guide vanes can be adjusted in such a way by means of an actuator that the effective turbine cross section of the turbine is modified. This makes it possible to achieve different exhaust backpressures in the section between the cylinders and the exhaust turbocharger, depending on the operating state of the internal combustion engine, thereby allowing the output of the turbine and the output of the compressor to be adjusted according to requirements. The turbine guide vanes are adjusted to a desired boost pressure in accordance with specified characteristics.

In order to achieve an improvement in efficiency by simple means during nonsteady-state operation of the internal combustion engine, boost-pressure control is performed in accordance with different characteristics above and below a threshold value for the exhaust backpressure. This makes it possible to prevent the occurrence of uncontrolled increases in pressure in the exhaust line upstream of the turbine while the boost pressure is still rising after a positive load change. The internal combustion engine no longer has to expel the exhaust against an increased exhaust backpressure and efficiency is increased.

Another method for closed-loop control of the boost pressure is known from German Reference DE 195 31 871 C1. In order to improve efficiency during nonsteady-state operation of the internal combustion engine, especially after a positive load change from low load and engine-speed ranges, this publication proposes to determine the difference between the exhaust backpressure and the boost pressure as the controlled variable for closed-loop control in order to adjust the boost pressure. This makes it possible to detect an impermissibly high deviation in the exhaust backpressure in the case of a positive load change and to correct it by suitable measures.

The problem underlying the invention is to optimize the operating behaviour of the engine over all load and engine-speed ranges.

With the present method, the engine can be adjusted over the entire operating range with regard to the dual purpose of optimizing fuel consumption and optimizing dynamic response. By distinguishing between the steady-state and the nonsteady-state operating modes, every operating point of the internal combustion engine can be assigned the most favourable characteristic maps for the adjustment of the variable turbine geometry.

The distinction between the different operating modes is made by means of an engine parameter that allows non-steady operation to be identified. The load gradient and/or the engine-speed gradient are determined or the engine preamble. Nonsteady-state operation is present when the engine parameter exceeds a given limiting value. Below the limiting value, the engine is in steady-state mode.

Nonsteady-state operation and steady-state operation are each assigned a characteristic map, which is used as a basis for adjusting of the variable component of the turbine geometry in order to exert a favourable influence on the operating behaviour of the exhaust turbine with regard to consumption and dynamic behaviour. In this context, the characteristic map assigned to steady-state operation is configured for a low boost pressure and optimum consumption and the characteristic map assigned to nonsteady-state operation is configured for a higher boost pressure and optimum dynamic response. In the configuration for optimum consumption, the air flow rate in the lower load range of the engine is reduced, thereby allowing exhaust and refill losses to be minimized and low fuel consumption to be achieved. This mode of operation is best suited to journeys at approximately constant speed and load, e.g. for open highway travel.

In the configuration for optimum dynamic response, it is advantageous to increase the air flow rate, especially in the lower load range, in order to make available sufficient engine power and, in particular, to enable rapid changes in power. This operating mode is best suited to urban driving conditions.

Once nonsteady-state operation has been detected by means of the engine parameter, it can be maintained for a specifiable holding time. Only after the holding time has expired is the current operating mode expediently reidentified and, depending on the value of the engine parameter, nonsteady-state operation is maintained for a further holding period or a switch made to steady-state operation.

On the other hand, in the characteristic map for optimum consumption, which is assigned to steady-state operation, the variable turbine geometry is expediently held in the open position when the engine speed is low and, at the same time, the load is low, thereby keeping the exhaust backpressure acting on the turbine, the power transmitted to the compressor and the boost pressure at a relatively low level. The exhaust and refill losses are minimized and fuel consumption is reduced.

In the characteristic map assigned to nonsteady-state operation, which is optimized for dynamic response, the variable turbine geometry is advantageously held in the pressure build-up position at low load and low engine speed, in which position the exhaust backpressure upstream of the turbine is increased and the flow of exhaust gas strikes the turbine rotor at a higher speed. This results in a higher boost pressure that has a positive effect on dynamic behaviour.

Adjustment to the desired boost pressure can be performed by closed-loop or open-loop control, a distinction expediently being made between closed-loop and open-loop control by means of further state variables of the engine, in particular by means of the absolute value of the engine speed and load. Thus, for example, open-loop control can be performed at low engine speeds/loads and closed-loop control can be performed at higher engine speeds/loads. Open-loop control at low engine speeds/loads has the advantage of being unaffected by external influences such as falling atmospheric pressure in operation at altitude, which would be superimposed on the boost pressure and would exert an impermissibly great effect in the case of closed-loop control. In the case of closed-loop control operations in the higher engine-speed/load range, the system preferably adjusts to a desired boost-pressure value specified in the characteristic map while, in the case of open-loop control operations, the positioning of the variable turbine geometry is performed in accordance with the values stored in the characteristic map.

It may be expedient to combine closed-loop and open-loop control by first of all adjusting to a rough value for the boost pressure by open-loop control, using the turbine position, and then adjusting to the desired boost-pressure value by closed-loop control for the purpose of fine adjustment. In this case, each operating mode can be assigned two or, if appropriate, more characteristic maps. It is possible to distinguish between the characteristic maps within an operating mode by means of additional engine parameters.

BRIEF DESCRIPTION OF THE DRAWINGS

Further advantages and expedient embodiments can be taken from the further claims, the description of the figures and the drawings, in which:

DETAILED DESCRIPTION OF THE PREFERRED EMBODIMENTS

Figure 1:
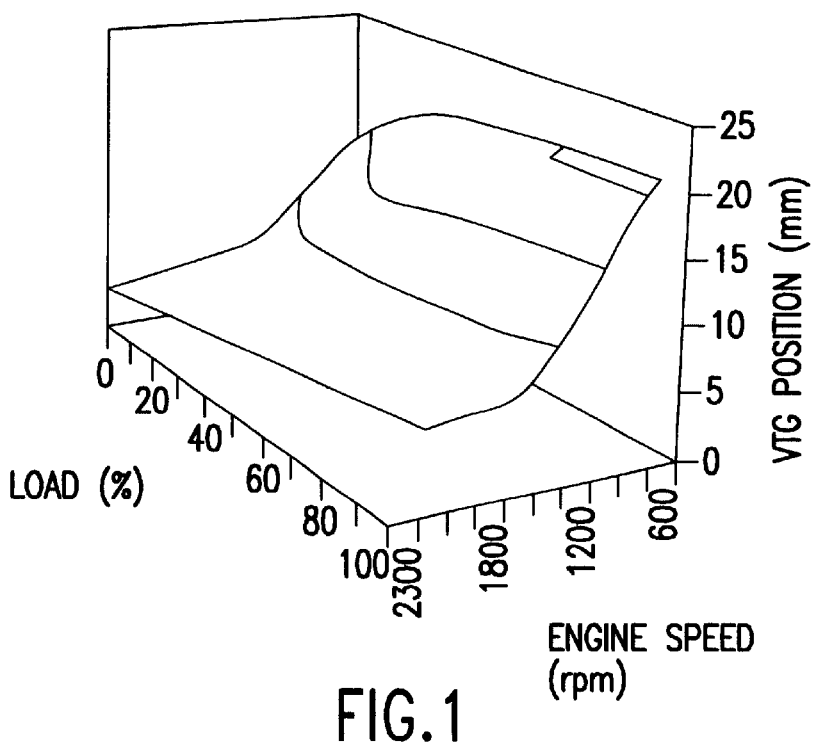
FIG. 1 shows a characteristic map for steady-state operation with position values for the variable turbine geometry.
Figure 2:
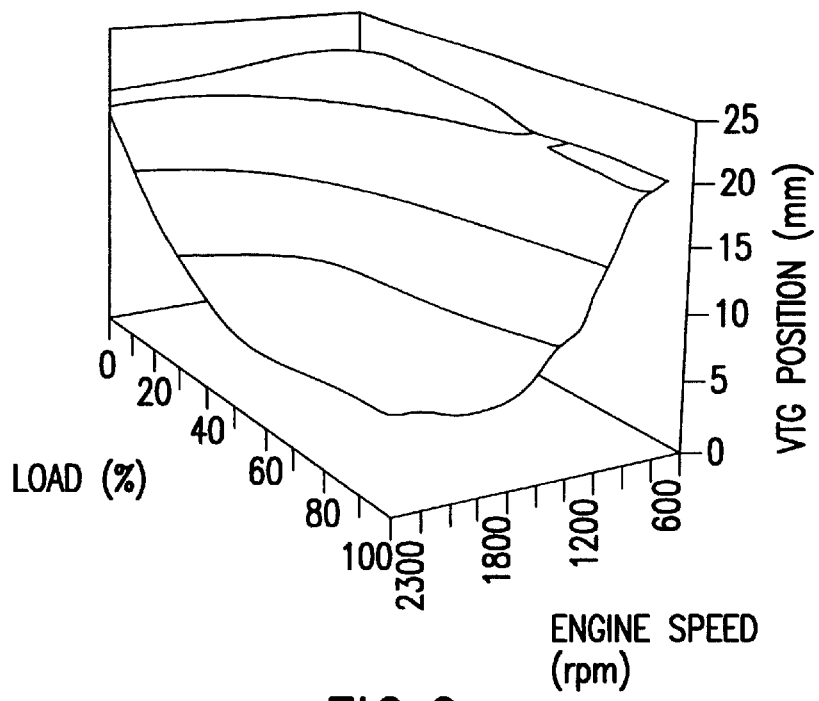
FIG. 2 shows a characteristic map corresponding to FIG. 1 but intended for nonsteady-state operation.

The characteristic maps illustrated in FIGS. 1 and 2 for steady-state operation and nonsteady-state operation of a forced-induction internal combustion engine with variable turbine geometry (VTG) each show various positions of the turbine geometry as a function of load and engine speed with typical scaling for a commercial vehicle. The actuating element of the turbine geometry is acted upon by actuating signals as a function of load and engine speed, whereupon the turbine geometry assumes the positions plotted on the vertical axis. Adjustments can be performed by way of open-loop control what has the advantage of rapid implementation because the actuating signals for the turbine geometry can be specified directly.

However, it is also possible to use a closed-loop control system instead of an open-loop control system. For closed-loop control desired boost-pressure values are expediently specified as a function of the load and engine speed and the boost pressure in the intake section downstream of the compressor is adjusted to the current desired value by varying the turbine geometry.

FIG. 1 shows a characteristic map for steady-state operation for an operating mode for optimum consumption, and FIG. 2 shows a characteristic map for nonsteady-state operation for an engine operating mode oriented towards dynamic response. The characteristic map in FIG. 1 or that in FIG. 2 is used as a basis for open-loop or closed-loop control, depending on the current operating mode of the engine. The distinction between the two operating modes is made by means of an engine parameter that allows clear identification of the instantaneous operating mode-steady-state operation or nonsteady-state operation. The load gradient and/or the engine-speed gradient are determined as the engine parameter and are compared with a specified limiting value. If the engine parameter is above the limiting value, the internal combustion engine is in the nonsteady-state mode and the characteristic map assigned to nonsteady-state operation is taken into account; below the limiting value, operation is in the steady-state mode with the associated characteristic map. The rate of change of the load is used as the load gradient and the rate of change of the engine speed is used as the engine-speed gradient in determining the engine parameter. The engine parameter can relate either to the load gradient or to the engine-speed gradient or to a combination of the load and the engine-speed gradient.

In the characteristic maps illustrated, a VTG position equal to zero means that the variable turbine geometry is in the open position, in which moreover the effective turbine cross section is at its maximum. Conversely, when the VTG position has been set to the maximum, this indicates that the variable turbine geometry has been moved into the pressure build-up position, in which the effective turbine cross section has been reduced to a minimum.

A turbine with an axial slide, a turbine with radial guide vanes or a flap-type turbine can be used as the VTG.

From the characteristic map in FIG. 1 assigned to steady-state operation, it can be seen that the VTG is in the open position at low load, with the result that the exhaust backpressure builds up only slightly, if at all. The turbine delivers only low power and, as a result, the compressor is driven only slightly and the air flow rate through the internal combustion engine is kept low. The exhaust and refill losses are thereby minimized and fuel consumption is lowered.

The characteristic map in FIG. 1 furthermore also applies to operating points of the engine in higher load and engine-speed ranges. When the load is high but the engine speed is low, the VTG position rises to a maximum and the VTG is in the pressure build-up position, in which the effective turbine cross section is at a minimum and the exhaust backpressure is increased. The turbine and compressor outputs are increased.

When the load is high and the engine speed is high, e.g. on constant slopes climbed at constant speed, the VTG is close to its open position in steady-state operation. A reduction in the turbine cross section is not necessary since the cylinders are supplied with a sufficient quantity of oxygen by the engine's induction effect.

From the characteristic map in FIG. 2 assigned to nonsteady-state operation, it can be seen that in the low load range the VTG is in the pressure build-up position, in which the exhaust backpressure and the boost pressure are increased. When there is a subsequent increase in load or engine speed, there is thus sufficient boost pressure available right at the beginning of the process of increase and the process of increase can be carried out within a shorter time.

According to FIG. 2, the VTG is in the pressure build-up position in nonsteady-state operation at low load and low engine speed, at low load and high engine speed and at high load and low engine speed. Only at high load and high engine speed is the VTG moved into the open position.

The load gradient and/or the engine-speed gradient for determining the engine parameter can be determined at regular discrete time intervals. If nonsteady-state operation is identified, the characteristic map assigned to nonsteady-state operation can be taken into account for a specified holding time. Once the holding time has expired, the system changes to the characteristic map for steady-state operation unless the engine parameter indicates continuing nonsteady-state operation.

Figure 3:
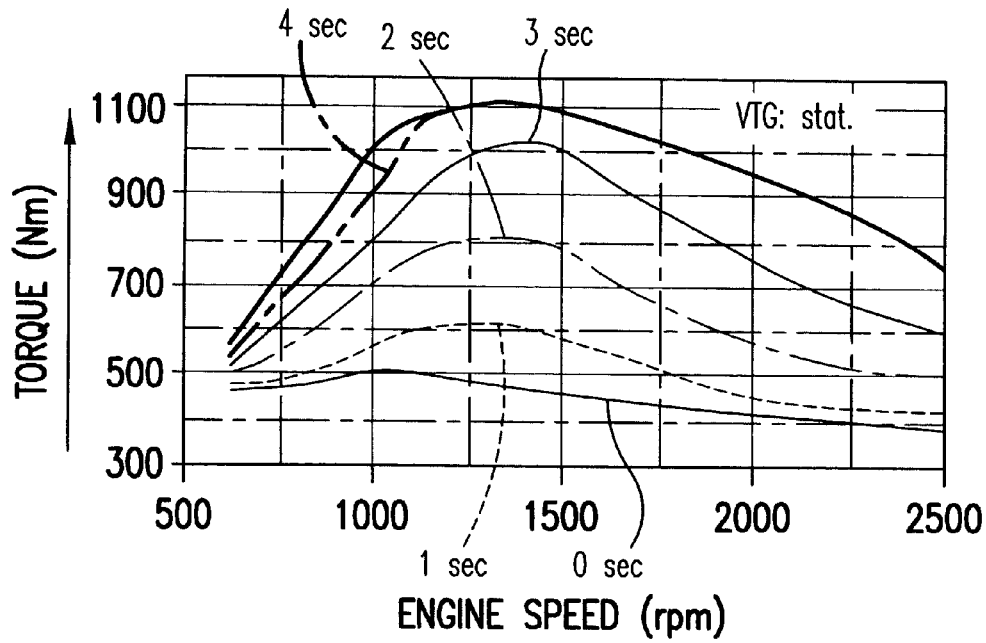
FIG. 3 shows various torque/engine-speed curves for steady-state operation.
Figure 4:
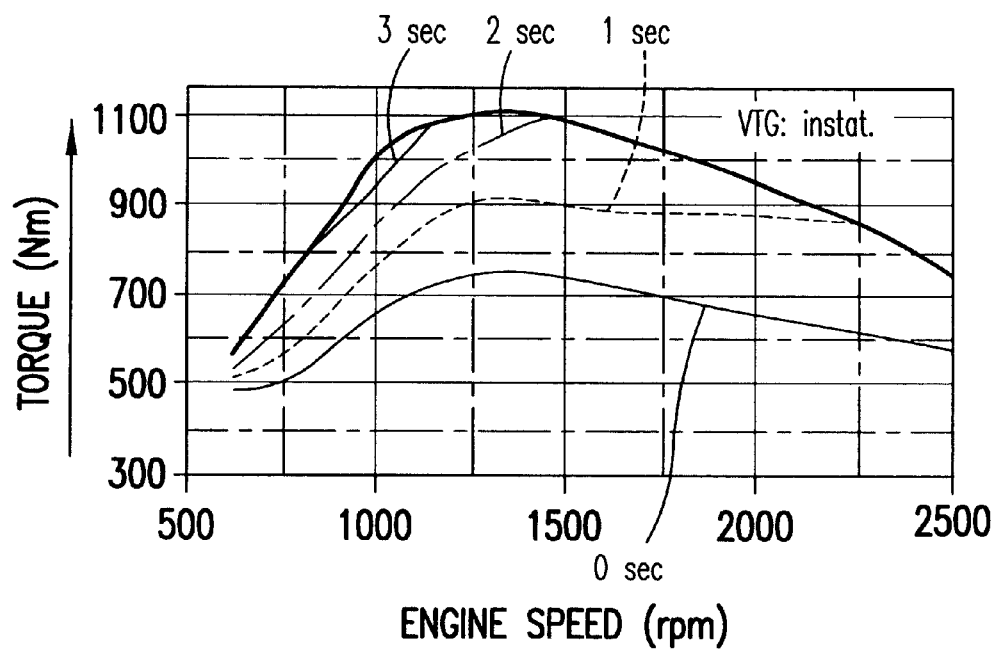
FIG. 4 shows various torque/engine-speed curves for nonsteady-state operation.

FIGS. 3 and 4 illustrate the difference in dynamic behaviour when using a characteristic map (FIG. 3) configured for steady-state operation and optimized for consumption and when using a characteristic map (FIG. 4) configured for nonsteady-state operation and oriented towards dynamic response. The diagrams in FIGS. 3 and 4 show the torque profile as a function of engine speed, each diagram containing a number of curves, which are provided with time indications and illustrate a dynamic development starting from a minimum curve and ending with a maximum curve. According to FIG. 3, the internal combustion engine requires about four seconds in accordance with the steady-state characteristic map to reach the maximum from the minimum in the case of a jump in load. According to FIG. 4, on the other hand, where the nonsteady-state characteristic map is used, the maximum is reached after just two to three seconds and the build-up of torque takes place significantly faster than when the steady-state characteristic map is used.

In principle, a number of characteristic maps can be specified for each operating mode. Additional parameters, e.g. load or engine speed, can be used to draw a distinction between the characteristic maps within an operating mode.

Further types of operation, such as powered driving or engine braking can furthermore be distinguished, it again being possible to assign to each of these types of operation the operating modes of steady-state operation and nonsteady-state operation and to assign one or more characteristic maps to each operating mode.

The method can be employed both for forced-induction internal combustion engines for commercial vehicles and for passenger cars. The method can be used for spark-ignition engines and for diesel engines.

It is also possible to use functions instead of characteristic maps.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for a closed-loop or an open-lop control of a forced-induction internal combustion engine, said engine including an exhaust turbo charger having an exhaust turbine with a variable turbine geometry for a variable adjustment of an effective turbine cross-section and a boost-air compressor where different operating states of the engine are assigned different characteristics maps with engine-operating and/or engine-state variables and wherein the turbine geometry is adjustable in accordance with the characteristic maps between an open position and a pressure built-up position and when there is a change in a significant engine parameter, the system switches between two of the characteristic maps, said method comprising the steps of:

determining the engine parameter from at least one of the load gradient and the engine-speed gradient for the purpose of identifying a steady-state operation or a non-steady state operation of the engine;

assigning a first characteristic map to the steady-state operation and a second characteristic map to the non-steady state operation;

configuring the first characteristic map assigned to the steady-state operation for a lower boost pressure and an optimum consumption; and configuring the second characteristic map assigned to non-steady operation for a higher boost pressure and an optimum dynamic response.

2. The method according to claim 1, wherein a closed-loop adjustment to values of the respective characteristic map takes place in at least one operating mode: the steady-state operation/the nonsteady-state operation.

3. The method according to claim 2, wherein at least one characteristic map with desired boost-pressure values is specified.

4. The method according to claim 1, wherein an open-loop adjustment to values of the respective characteristic map takes place in at least one operating mode: the steady-state operation/the nonsteady-state operation.

5. The method according to claim 4, wherein at least one characteristic map with positions for the variable turbine geometry is specified.

6. The method according to claim 2, wherein the characteristic map oriented towards the dynamic response for the nonsteady-state operation is maintained for a specified holding time.

7. The method according to claim 6, wherein the operating mode is reidentified once the holding time has expired.

8. The method according to claim 1, wherein the variable turbine geometry is held in the open position at low load and low engine speed in the characteristic map for the optimum consumption.

9. The method according to claim 1, wherein the variable turbine geometry is held in the pressure build-up position at low load and low engines speed in the characteristic map for the optimum dynamic response.

* * * * *